(12) United States Patent
Crouch et al.

(10) Patent No.: US 12,072,421 B2
(45) Date of Patent: Aug. 27, 2024

(54) MIXED MULTIPLE INPUT MULTIPLE OUTPUT (MIMO) RADAR

(71) Applicant: Aurora Innovation, Inc., Palo Alto, CA (US)

(72) Inventors: Stephen Crouch, Bozeman, MT (US); Chunshu Li, San Jose, CA (US)

(73) Assignee: AURORA OPERATIONS, INC., Mountain View, CA (US)

( * ) Notice: Subject to any disclaimer, the term of this patent is extended or adjusted under 35 U.S.C. 154(b) by 844 days.

(21) Appl. No.: 17/132,075

(22) Filed: Dec. 23, 2020

(65) Prior Publication Data

US 2022/0099837 A1 Mar. 31, 2022

Related U.S. Application Data

(60) Provisional application No. 63/085,856, filed on Sep. 30, 2020.

(51) Int. Cl.
*G01S 17/931* (2020.01)
*G01S 13/58* (2006.01)
*G01S 17/89* (2020.01)

(52) U.S. Cl.
CPC .......... *G01S 17/931* (2020.01); *G01S 13/583* (2013.01); *G01S 17/89* (2013.01)

(58) Field of Classification Search
CPC ....... G01S 17/931; G01S 17/89; G01S 13/583
See application file for complete search history.

(56) References Cited

U.S. PATENT DOCUMENTS

| | | | |
|---|---|---|---|
| 2005/0128965 A1* | 6/2005 | Seo | H04B 7/0617 370/208 |
| 2020/0025914 A1 | 1/2020 | Li | |
| 2020/0300965 A1* | 9/2020 | Wu | G01S 13/505 |
| 2021/0264255 A1* | 8/2021 | Yoo | G06N 3/045 |

FOREIGN PATENT DOCUMENTS

WO 2022072487 4/2022

OTHER PUBLICATIONS

European Patent Office, International Search Report and Written Opinion for PCT/US2021/052641 mailed Jan. 19, 2022.
Fuhrmann, et al. "Ambiguity function analysis for the Hybridge MIMO Phased-array Radar", Radar Conference, 2009 IEEE, IEEE, Piscataway, NJ, USA, May 4, 2009, p. 1-6; XP031461640, ISBN: 978-1-4244-2870-0, abs., sec. 3.
Rabideau, "Doppler-offset waveforms for MIMO radar", Radar Conference (Radar), 2011 IEEE, IEEE, May 23, 2011, pp. 965-970, XP031902242, DOI: 10.1109/RADAR.2011.5960679, ISBN: 978-1-4244-8901-5, sec. IV.B.
Wikipedia; MIMO Radar, last updated Dec. 16, 2020.
(Continued)

*Primary Examiner* — Marc Anthony Armand
(74) *Attorney, Agent, or Firm* — Gray Ice Higdon

(57) ABSTRACT

A multiple input multiple output (MIMO) radar sensor encodes or decodes radar signals generated by multiple MIMO transmitters using a mixture of sub-set digital codes that discriminate between different sub-sets of MIMO transmitters and Doppler-division codes that discriminate between different MIMO transmitters within each of the sub-sets.

20 Claims, 5 Drawing Sheets

(56) References Cited

OTHER PUBLICATIONS

Giannini et al; "A 79 GHz Phase-Modulated 4 GHz-BW CW Radar Transmitter in 28 nm CMOS," in IEEE Journal of Solid-State Circuits, vol. 49, No. 12, pp. 2925-2937, Dec. 2014.
Bourdoux et al; "PMCW waveform and MIMO technique for a 79 GHz CMOS automotive radar," 2016 IEEE Radar Conference (RadarConf), Philadelphia, PA, 2016, pp. 1-5.
Overdevest et al; "Doppler Influence on Waveform Orthogonality in 79 GHz MIMO Phase-Coded Automotive Radar," in IEEE Transactions on Vehicular Technology, vol. 69, No. 1, pp. 16-25, Jan. 2020.
Pfeffer et al; "FMCW MIMO Radar System for Frequency-Division Multiple TX-Beamforming," in IEEE Transactions on Microwave Theory and Techniques, vol. 61, No. 12, pp. 4262-4274, Dec. 2013.
Texas Instruments; Application Report—AWR2243 Cascade; Oct. 2017.
Och et al; "A Scalable 77 GHz Massive MIMO FMCW Radar by Cascading Fully-Integrated Transceivers," 2018 Asia-Pacific Microwave Conference (APMC), Kyoto, 2018, pp. 1235-1237.
Texas Instruments; "mmWave cascade imaging radar RF evaluation module"; https://www.ti.com/tool/MMWCAS-RF-EVM [retrieved from internet wayback machine]; Oct. 9, 2019.
Texas Instruments; "AWR1843"; https://www.ti.com/tool/MMWCAS-RF-EVM [retrieved from internet wayback machine]; Jan. 10, 2019.

\* cited by examiner

MIXED MULTIPLE INPUT MULTIPLE OUTPUT (MIMO) RADAR

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate mapping data exists). Finally, Level 5 autonomy represents a level of autonomy where a vehicle is capable of operating free of operator control under any circumstances where a human operator could also operate.

The fundamental challenges of any autonomy-related technology relate to collecting and interpreting information about a vehicle's surrounding environment, along with making and implementing decisions to appropriately control the vehicle given the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

One particular technology that is increasingly relied upon for collecting information about a vehicle's surrounding environment is radar, which is based on the emission, reflection and sensing of radio wave electromagnetic radiation within an environment to detect, and in some instances, determine the position and velocity of various objects within the environment. Despite continuing improvements to radar performance, however, both cost and technical limitations continue to exist, so a continuing need exists for improvements to radar technology, and particularly for radar technology used in connection with the control of an autonomous vehicle.

SUMMARY

The present disclosure is generally related to multiple input multiple output (MIMO) radar sensors, e.g., for use in automotive applications such as in autonomous vehicles, that employ a mixed MIMO modulation scheme that encodes or decodes radar signals generated by multiple MIMO transmitters using a mixture of sub-set digital codes that discriminate between different sub-sets of MIMO transmitters and Doppler-division codes that discriminate between different MIMO transmitters within each of the sub-sets.

Therefore, consistent with one aspect of the invention, a radar sensor may include one or more multiple input multiple output (MIMO) receivers configured to receive radar signals generated by a plurality of MIMO transmitters, and control logic coupled to the one or more MIMO receivers, the control logic configured to decode the received radar signals using a mixture of sub-set digital codes that discriminate between a plurality of sub-sets of MIMO transmitters of the plurality of MIMO transmitters and Doppler-division codes that discriminate between different MIMO transmitters within each of the plurality of sub-sets of MIMO transmitters.

Further, in some implementations, the radar signals generated by the plurality of MIMO transmitters include a plurality of frequency modulated continuous wave (FMCW) chirps, and the control logic is configured to, for a first MIMO receiver in the one or more MIMO receivers, perform range transformation over a plurality of chirps received by the first MIMO receiver to generate slow time radar data, demodulate the slow time radar data using sub-set digital codes associated with the plurality of sub-sets of MIMO transmitters to generate sub-set partitioned slow time radar data, perform Doppler transformation on the sub-set partitioned slow time radar data to generate sub-set partitioned Doppler radar data, and demodulate the sub-set partitioned Doppler radar data using Doppler-division codes for the transmitters within each of the plurality of sub-sets of MIMO transmitters.

In addition, in some implementations, the sub-set digital codes are pseudo-random digital codes selected from pseudo-random code sequences associated with each of the plurality of sub-sets of MIMO transmitters. Further, in some implementations, the plurality of MIMO transmitters are disposed on a plurality of MIMO radar transceiver devices, and the MIMO transmitters disposed on each MIMO radar transceiver device are in the same sub-set of MIMO transmitters.

Moreover, in some implementations, the control logic is further configured to dynamically generate the plurality of sub-sets of MIMO transmitters during runtime of the radar sensor. Further, in some implementations, the control logic is configured to dynamically reassign MIMO transmitters to sub-sets during runtime of the radar sensor in response to one or more runtime conditions.

Consistent with another aspect of the invention, a radar sensor may include a plurality of multiple input multiple output (MIMO) transmitters configured to transmit radar signals, and control logic coupled to the plurality of MIMO transmitters, the control logic configured to encode the radar signals transmitted by the plurality of MIMO transmitters using a mixture of sub-set digital codes that discriminate between a plurality of sub-sets of MIMO transmitters of the plurality of MIMO transmitters and Doppler-division codes that discriminate between different MIMO transmitters within each of the plurality of sub-sets of MIMO transmitters.

In some implementations, the radar signals generated by the plurality of MIMO transmitters include a plurality of frequency modulated continuous wave (FMCW) chirps, and the control logic is configured to, for a first MIMO transmitter from the plurality of MIMO transmitters that is assigned to a first sub-set of MIMO transmitters from the plurality of sub-sets of MIMO transmitters, control a phase shift of each chirp generated by the first MIMO transmitter using a combination of a sub-set digital code for the first sub-set and a Doppler-division code for the first MIMO transmitter. Moreover, in some implementations, each of the sub-set digital code for the sub-set and the Doppler-division code for the first MIMO transmitter defines a phase shift, and the control logic is configured to control the phase shift of a first chirp generated by the first MIMO transmitter based upon a sum of the phase shifts defined by the sub-set digital code for the sub-set and the Doppler-division code for the first MIMO transmitter. Further, in some implementations, the sub-set digital codes are pseudo-random digital codes selected from pseudo-random code sequences associated with each of the plurality of sub-sets of MIMO transmitters.

In addition, in some implementations, the plurality of MIMO transmitters are disposed on a plurality of MIMO radar transceiver devices, and the MIMO transmitters disposed on each MIMO radar transceiver device are in the same sub-set of MIMO transmitters. Also, in some implementations, the control logic is further configured to dynamically generate the plurality of sub-sets of MIMO transmitters during runtime of the radar sensor. Moreover, in some implementations, the control logic is configured to dynamically reassign MIMO transmitters to sub-sets during runtime of the radar sensor in response to one or more runtime conditions.

Consistent with another aspect of the invention, a radar sensor may include a plurality of multiple input multiple output (MIMO) transmitters configured to generate a plurality of radar signals, a plurality of MIMO receivers configured to receive the plurality of radar signals generated by the plurality of MIMO transmitters, and control logic coupled to the plurality of MIMO transmitters and the plurality of MIMO receivers, the control logic configured to encode the radar signals transmitted by the plurality of MIMO transmitters using a mixture of sub-set digital codes that discriminate between a plurality of sub-sets of MIMO transmitters of the plurality of MIMO transmitters and Doppler-division codes that discriminate between different MIMO transmitters within each of the plurality of sub-sets of MIMO transmitters, and the control logic configured to decode the radar signals received by the plurality of MIMO receivers using the mixture of sub-set digital codes and Doppler-division codes.

Consistent with another aspect of the invention, a radar sensor may include a plurality of multiple input multiple output (MIMO) radar transceiver devices, each MIMO radar transceiver device including a plurality of MIMO receivers and a plurality of MIMO transmitters, first control logic coupled to a first MIMO transmitter of the plurality of MIMO transmitters that is disposed in a first MIMO radar transceiver device from the plurality of MIMO radar transceiver devices, the first control logic configured to, for each of a plurality of frequency modulated continuous wave (FMCW) chirps transmitted by the first MIMO transmitter determine a sub-set digital code that identifies the first MIMO radar transceiver device, determine a Doppler-division code that identifies the first MIMO transmitter, and determine a phase shift for the chirp by combining the sub-set digital code and the Doppler-division code, and second control logic coupled to a first MIMO receiver of the plurality of MIMO receivers, the second control logic configured to perform a range transformation on sampled data associated with a radar signal received by the first MIMO receiver over the plurality of chirps to generate slow time radar data, demodulate the slow time radar data using the sub-set digital code for each chirp to generate sub-set partitioned slow time radar data, perform a Doppler transformation on the sub-set partitioned slow time radar data to generate sub-set partitioned Doppler radar data, and demodulate the sub-set partitioned Doppler radar data using the Doppler-division code for each chirp.

Consistent with another aspect of the invention, a method of sensing with a radar sensor that includes a plurality of multiple input multiple output (MIMO) transmitters and a plurality of MIMO receivers may include determining a phase shift for a first MIMO transmitter from the plurality of MIMO transmitters, where the phase shift is determined using a sub-set digital code that identifies the first MIMO transmitter as being within a first sub-set of MIMO transmitters from a plurality of sub-sets of MIMO transmitters for the plurality of MIMO transmitters and a Doppler-division code that identifies the first MIMO transmitter within the first sub-set of MIMO transmitters, transmitting a first radar signal with the first MIMO transmitter using the determined phase shift, receiving a reflected signal caused by reflection of the first radar signal by a target using a first MIMO receiver from the plurality of MIMO receivers, decoding the reflected signal using the sub-set digital code and the Doppler-division code, and identifying the target based upon decoding of the reflected signal.

Consistent with another aspect of the invention, a method of transmitting a radar signal with a radar sensor that includes a plurality of multiple input multiple output (MIMO) transmitters may include with a first MIMO transmitter disposed in a first sub-set of a plurality of sub-sets of MIMO transmitters for the plurality of MIMO transmitters, generating a plurality of frequency modulated continuous wave (FMCW) chirps, and controlling a phase shift of each of the FMCW chirps using a sub-set digital code that identifies the first sub-set and a Doppler-division code that identifies the first MIMO transmitter within the first sub-set.

Consistent with another aspect of the invention, a method of receiving a radar signal with a radar sensor that includes a multiple input multiple output (MIMO) receiver and a plurality of MIMO transmitters may include receiving a radar signal with the MIMO receiver, the radar signal including a plurality of frequency modulated continuous wave (FMCW) chirps, downconverting and sampling the received radar signal to generate sampled data over the plurality of chirps, performing a range transformation on the sampled data to generate slow time radar data, demodulating the slow time radar data using sub-set digital codes associated with a plurality of sub-sets of MIMO transmitters for the plurality of MIMO transmitters to generate sub-set partitioned slow time radar data, performing a Doppler transformation on the sub-set partitioned slow time radar data to generate sub-set partitioned Doppler radar data, and demodulating the sub-set partitioned Doppler radar data using Doppler-division codes for the MIMO transmitters within each of the plurality of sub-sets of MIMO transmitters.

Consistent with another aspect of the invention, a program product may include a non-transitory computer readable medium, and program code stored on the non-transitory computer readable medium and configured upon execution by one or more processors to decode radar signals generated by a plurality of multiple input multiple output (MIMO) transmitters and received by one or more MIMO receivers using a mixture of sub-set digital codes that discriminate between a plurality of sub-sets of MIMO transmitters of the plurality of MIMO transmitters and Doppler-division codes that discriminate between different MIMO transmitters within each of the plurality of sub-sets of MIMO transmitters.

Consistent with another aspect of the invention, a program product may include a non-transitory computer readable medium, and program code stored on the non-transitory computer readable medium and configured upon execution by one or more processors to encode radar signals transmitted by a plurality of multiple input multiple output (MIMO) transmitters using a mixture of sub-set digital codes that discriminate between a plurality of sub-sets of MIMO transmitters of the plurality of MIMO transmitters and Doppler-division codes that discriminate between different MIMO transmitters within each of the plurality of sub-sets of MIMO transmitters.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

The herein-described implementations are generally directed to various improvements associated with multiple input multiple output (MIMO) radar sensors, e.g., for use in connection with the control of an autonomous or other type of vehicle, among other applications. Prior to discussing such improvements, however, a brief discussion of an autonomous vehicle environment and of MIMO radar sensors are provided below.

Autonomous Vehicle Environment

Figure 1:
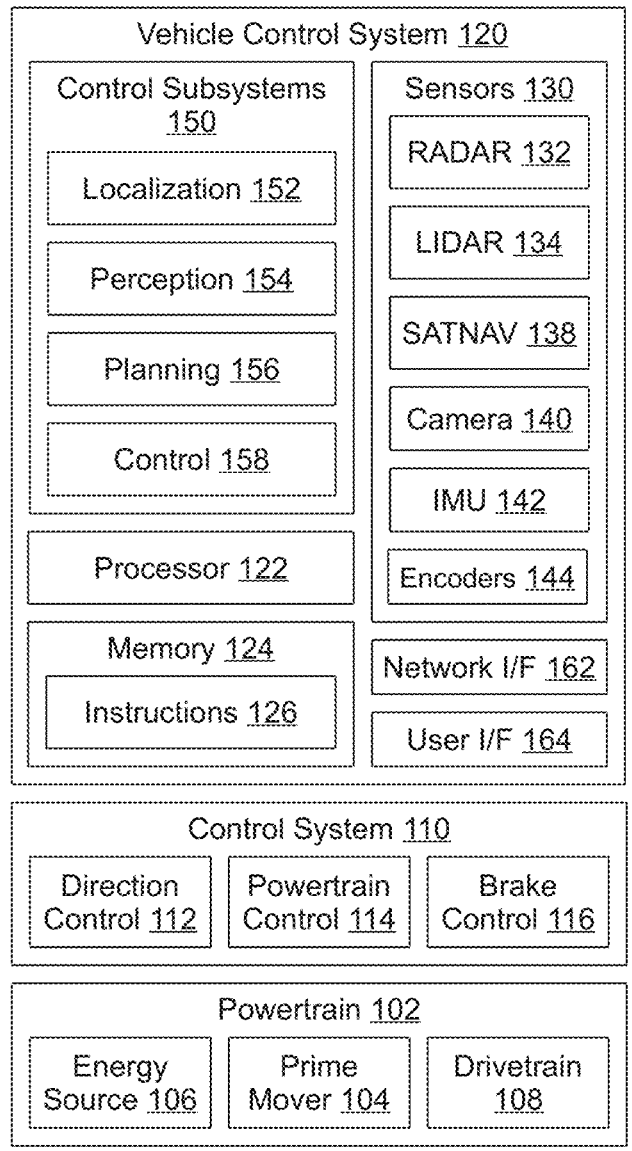
FIG. 1 illustrates an example environment in which implementations disclosed herein can be implemented.

Turning to the Drawings, wherein like numbers denote like parts throughout the several views, FIG. 1 illustrates an autonomous vehicle 100 suitable for utilizing the various techniques described herein. Vehicle 100, for example, may include a powertrain 102 including a prime mover 104 powered by an energy source 106 and capable of providing power to a drivetrain 108, as well as a control system 110 including a direction control 112, a powertrain control 114, and brake control 116. Vehicle 100 may be implemented as any number of different types of vehicles, including vehicles capable of transporting one or both of people and cargo, and it will be appreciated that the aforementioned components 102-116 may vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors, an internal combustion engine, or a combination thereof (among others). The energy source 106 may include, for example, one or more of a fuel system (e.g., providing gasoline, diesel, hydrogen, etc.), a battery system, solar panels or other renewable energy source, and a fuel cell system. Drivetrain 108 may include one or more of wheels, tires, a transmission and any other mechanical drive components suitable for converting the output of prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

Direction control 112 may include one or more actuators, one or more sensors, or a combination thereof for controlling and receiving feedback from the direction or steering components to enable the vehicle 100 to follow a desired trajectory. Powertrain control 114 may be configured to control the output of powertrain 102, e.g., to control the output power of prime mover 104, to control a gear of a transmission in drivetrain 108, etc., thereby controlling one or more of a speed and direction of the vehicle 100. Brake control 116 may be configured to control one or more brakes that slow or stop vehicle 100, e.g., disk or drum brakes coupled to the wheels of the vehicle.

Other vehicle types will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, implementations disclosed herein not limited to the particular application of the herein-described techniques in an autonomous wheeled land vehicle.

In the illustrated implementation, full or semi-autonomous control over vehicle 100 is implemented in a vehicle control system 120, which may include one or more processors 122 and one or more memories 124, with each processor 122 configured to execute program code instructions 126 stored in a memory 124. The processor(s) 122 may include, for example, one or more graphics processing units (GPUs), one or more central processing units (CPUs), or a combination thereof.

Sensors 130 may include various sensors suitable for collecting information from a vehicle's surrounding environment for use in controlling the operation of the vehicle. For example, sensors 130 may include one or more Radio Detection and Ranging (RADAR) sensors, with which a number of the techniques described herein may be implemented.

Sensors 130 may also optionally include one or more Light Detection and Ranging (LIDAR) sensors 132, as well as one or more satellite navigation (SATNAV) sensors 138, e.g., compatible with any of various satellite navigation systems such as GPS, GLONASS, Galileo, Compass, etc. Each SATNAV sensor 138 may be used to determine the location of the vehicle on the Earth using satellite signals. Sensors 130 may also optionally include one or more cameras 140, one or more inertial measurement units (IMUS) 142, one or more wheel encoders 144, or a combination thereof. Each camera 140 may be a monographic or stereographic camera and may record one or more of still and video imagers. Each IMU 142 may include multiple gyroscopes and accelerometers capable of detecting linear and rotational motion of the vehicle 100 in three directions. Wheel encoders 144 may be used to monitor the rotation of one or more wheels of vehicle 100.

The outputs of sensors 130 may be provided to a set of control subsystems 150, including, for example, a localization subsystem 152, a perception subsystem 154, a planning subsystem 156, and a control subsystem 158. As will become more apparent hereinafter, radar sensors 132 may be used by one or more of such subsystems 152-158 to control an autonomous vehicle.

Localization subsystem 152 may be principally responsible for precisely determining the location and orientation (also sometimes referred to as "pose") of vehicle 100 within its surrounding environment, and generally within some frame of reference.

Perception subsystem 154 may be principally responsible for detecting, tracking and identifying elements within the environment surrounding vehicle 100. For example, perception subsystem 154 may, at each of a plurality of iterations, determine a pose, classification, and velocity for each of one or more objects in the environment surrounding vehicle 100. Further, for example, the perception subsystem 154 may track various objects over multiple iterations. For instance, the perception subsystem 154 may track an additional vehicle over multiple iterations as the additional vehicle moves relative to vehicle 100.

Planning subsystem 156 may be principally responsible for planning a trajectory for vehicle 100 over some timeframe given a desired destination as well as the static and moving objects within the environment. For example, and as described herein, planning subsystem 156 may plan a trajectory for vehicle 100 based at least in part on one or more of a pose, classification, and velocity for each of one or more objects in an environment of the vehicle 100 in the environment surrounding vehicle 100. In some implementations, planning subsystem 156 may plan the trajectory for the vehicle 100 by generating, and considering, candidate trajectories for each of one or more additional mobile objects in the environment. Planning subsystem 156 may determine a candidate trajectory for an object at an iteration based on a pose, classification, velocity, or a combination thereof for the iteration, and may track the object over multiple iterations.

Control subsystem 158 may be principally responsible for generating suitable control signals for controlling the various controls in control system 110 in order to implement the planned trajectory of the vehicle 100.

It will be appreciated that the collection of components illustrated in FIG. 1 for vehicle control system 120 is merely exemplary in nature. Individual sensors may be omitted in some implementations. Additionally or alternatively, in some implementations multiple sensors of the types illustrated in FIG. 1 may be used for redundancy or to cover different regions around a vehicle, and other types of sensors may be used. Likewise, different types and combinations of control subsystems may be used in other implementations. Further, while subsystems 152-158 are illustrated as being separate from processors 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processors and memory. Subsystems in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize circuitry, processors, sensors or other components. Further, the various components in vehicle control system 120 may be networked in various manners.

In some implementations, vehicle 100 may also include a secondary vehicle control system (not illustrated), which may be used as a redundant or backup control system for vehicle 100. In some implementations, the secondary vehicle control system may be capable of fully operating autonomous vehicle 100 in the event of an adverse event in vehicle control system 120, while in other implementations, the secondary vehicle control system may only have limited functionality, e.g., to perform a controlled stop of vehicle 100 in response to an adverse event detected in primary vehicle control system 120. In still other implementations, the secondary vehicle control system may be omitted.

In addition, while powertrain 102, control system 110, and vehicle control system 120 are illustrated in FIG. 1 as being separate systems, in other implementations, some of all of these systems may be combined into a single system, e.g., with control system 110 and vehicle control system 120 combined into a single autonomous vehicle control system, or using other combinations. Further, in other implementations, some or all of the functionality illustrated as being within one system in FIG. 1 may be implemented in another system.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory (RAM) devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in vehicle 100, e.g., any cache memory in a processor, as well as any storage capacity used as a virtual memory, e.g., as stored on a mass storage device or on another computer or controller. One or more processors illustrated in FIG. 1, or entirely separate processors, may be used to implement additional functionality in vehicle 100 outside of the purposes of autonomous control, e.g., to control entertainment systems, to operate doors, lights, convenience features, etc. Processors may also be implemented in whole or in part within individual sensors in some implementations.

In addition, for additional storage, vehicle 100 may also include one or more mass storage devices, e.g., one or more of a removable disk drive, a hard disk drive, a direct access storage device (DASD), an optical drive (e.g., a CD drive, a DVD drive, etc.), a solid state storage drive (SSD), network attached storage, a storage area network, and a tape drive, among others. Furthermore, vehicle 100 may include a user interface 164 to enable vehicle 100 to receive a number of inputs from and generate outputs for a user or operator, e.g., one or more displays, touchscreens, voice interfaces, gesture interfaces, buttons and other tactile controls, etc. Otherwise, user input may be received via another computer or electronic device, e.g., via an app on a mobile device or via a web interface.

Moreover, vehicle 100 may include one or more network interfaces, e.g., network interface 162, suitable for communicating with one or more networks (e.g., one or more of a LAN, a WAN, a wireless network, and the Internet, among others) to permit the communication of information with other computers and electronic devices, including, for example, a central service, such as a cloud service, from which vehicle 100 receives environmental and other data for use in autonomous control thereof.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network, e.g., in a distributed, cloud-based, or client-server computing environment, whereby the processing required to implement the functions of a computer program may be allocated to multiple computers or services over a network.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter will be described in the context of fully functioning computers and systems, it will be appreciated that the various implementations described herein are capable of being distributed as a program product in a variety of forms, and that implementations may be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

MIMO Radar Sensors

Figure 2:
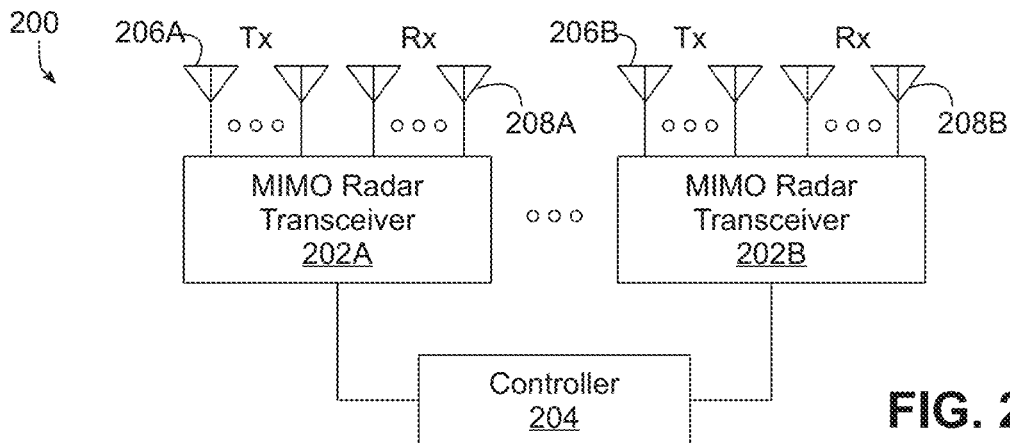
FIG. 2 illustrates an example implementation of a Multiple Input Multiple Output (MIMO) radar sensor that may be utilized by implementations disclosed herein.

FIG. 2 next illustrates an example radar sensor 200 within which the various techniques described herein may be implemented. In some implementations, radar sensor 200 can be a distributed radar sensor. In some implementations, sensor 200 includes one or more MIMO radar transceivers (e.g., transceivers 202A and 202B) coupled to a controller 204, with each MIMO radar transceiver generally including multiple transmit (Tx) antennas (e.g., transmit antennas 206A, 206B) and multiple receive (Rx) antennas (e.g., receive antennas 208A, 208B) to implement a phased antenna array.

Each transceiver 202A, 202B may be disposed on a separate integrated circuit (IC) or chip in some implementations, while in other implementations multiple transceivers may be disposed on the same chip. Further, multiple transceivers 202A, 202B may be disposed on separate or common modules, boards, cards, or housings in various implementations. In addition, it will be appreciated that, rather than utilizing transceivers that handle both transmission and reception of radar signals, some implementations may utilize separate circuitry for these functions.

Controller 204 is generally coupled to one or more transceivers. For example, controller 204 is coupled to each transceiver 202A, 202B for controlling both (i) the generation of radar signals for transmission or emission by transmit antennas 206A, 206B and (ii) the reception and processing of radar signals received by receive antennas 208A, 208B. It will be appreciated that the functionality implemented by controller 204 may be allocated in various manners in different implementations, e.g., using one or more chips that are separate from each transceiver 202A, 202B and disposed on the same or different module, board, card or housing, or being wholly or partially integrated into the same chips as one or more of the transceivers. The functionality of controller 204 may also be at least partially implemented external of any radar sensor in some implementations, e.g., integrated into other processors or controllers in the vehicle control system of an autonomous vehicle. Further, while a single controller 204 is illustrated in FIG. 2, the invention is not so limited, as multiple controllers may be used to implement different functionality in a radar sensor in some implementations, e.g., using multiple controllers integrated with each transceiver 202A, 202B. In some implementations, one or more of controller 204 and transceivers 202A, 202B may be implemented using one or more Monolithic Microwave Integrated Circuits (MMICs).

As such, it will be appreciated that the functionality described herein may in some implementations be implemented using various types of control logic, whether integrated into a transmitter, receiver or transceiver, processor, controller, computer system, etc., whether disposed on one or more integrated circuit chips, and whether incorporating hardwired logic or programmable logic capable of executing program code instructions. Control logic may also be considered to include analog circuitry, digital circuitry, or both in various implementations. As such, the invention is not limited to the particular control logic implementation details described herein.

Likewise, transmit antennas 206A, 206B and receive antennas 208A, 208B may be implemented in a wide variety of manners, e.g., as patch antennas disposed on one or more printed circuit boards or cards, or in some instances disposed on or in a package or chip and thus integrated with a transceiver or controller of the radar sensor, e.g., using antenna on packaging (AOP) or antenna on chip (AOC) technology. Antennas 206A, 206B, 208A, 208B may be omnidirectional or directional in different implementations. In some implementations, the same antennas may be used for both transmit and receive; however, in the illustrated implementations, separate antennas are used to handle the transmission and reception of radar signals. Therefore, a reference to an antenna as being a transmit antenna or a receive antenna herein does not necessarily require that the antenna be used exclusively for that purpose.

Figure 3:
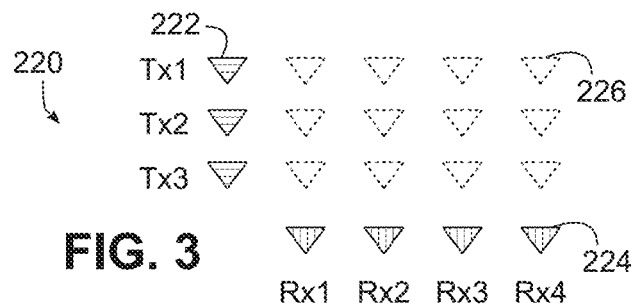
FIG. 3 illustrates an example virtual antenna array capable of being produced by a MIMO radar sensor that may be utilized by implementations disclosed herein.

Antennas 206A, 206B, 208A, 208B in the illustrated implementations are desirably physical arranged and electronically controlled to implement a MIMO virtual antenna array (VAA), i.e., an array of virtual array elements that individually represent unique transmit/receive antenna pairs. FIG. 3, for example, illustrates an example virtual antenna array 220 formed from a set of three physical transmit antennas 222 (Tx1, Tx2, Tx3, each of which corresponding, for example, to a transmit antenna 206A, 206B in FIG. 2) and four physical receive antennas 224 (Rx1, Rx2, Rx3, Rx4, each of which corresponding, for example, to a receive antenna 208A, 208B in FIG. 2), which together form a virtual antenna array having a 3×4 or 12 element array of virtual array elements 226, thereby increasing the effective number of antennas and improving cross-range resolution. It will be appreciated that different numbers or arrangements of physical transmit and receive antennas may be used to form different sizes and arrangements of virtual antenna arrays, so the invention is not limited to the specific array illustrated in FIG. 3.

Increasing the numbers of physical transmit antennas and physical receive antennas for a virtual antenna array, and thus the number of virtual array elements in the virtual antenna array, may generally be used to increase angular resolution, detection range or signal to noise ratio. In one example implementation, an individual transceiver chip having three transmit antennas and four receive antennas may be used to form a virtual antenna array having twelve virtual array elements, which may, in some instances, be used to form a one dimensional array of <5 cm length (e.g., emphasizing azimuth resolution) or in other instances form a two dimensional of at most about 1 cm×1 cm (e.g., providing coarse resolution in both azimuth and elevation). If four of such transceiver chips are used in the same virtual antenna array, however, a total of 12 transmit antennas and 16 receive antennas may be used to generate 192 virtual array elements. Such element counts may be used for example, to generate two dimensional array layouts over about a 10 cm×10 cm area, and allowing for an angular resolution of a few degrees in both azimuth and elevation.

Figure 4:
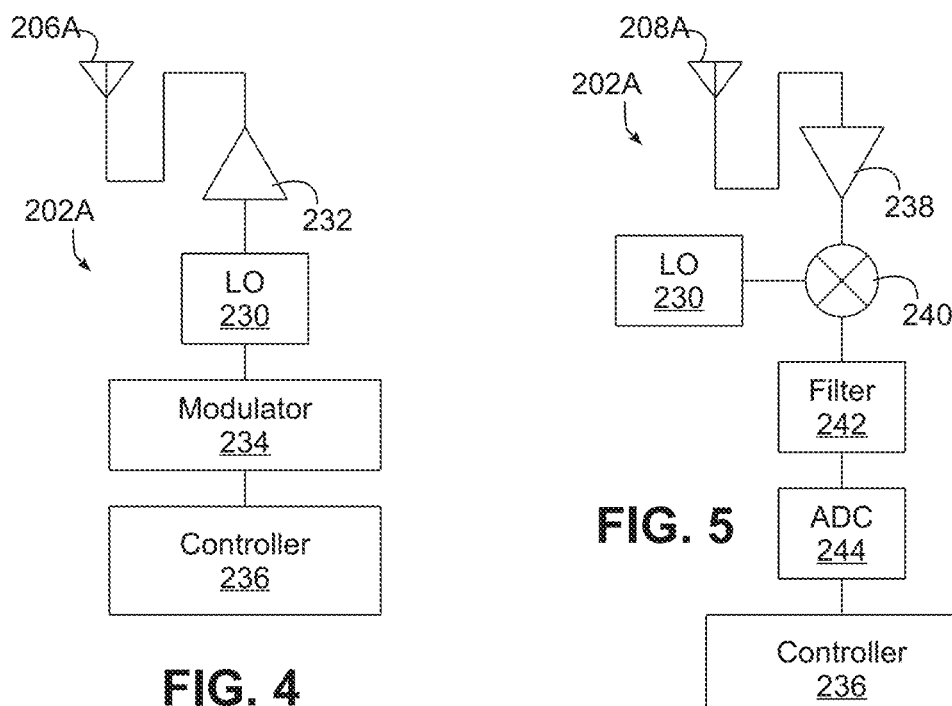
FIG. 4 illustrates an example transmitter channel for the MIMO radar sensor of FIG. 2.
Figure 5:
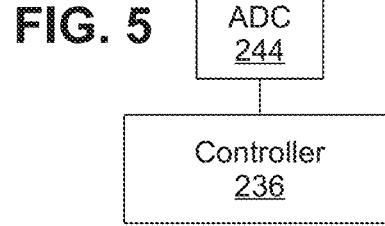
FIG. 5 illustrates an example receiver channel for the MIMO radar sensor of FIG. 2.

Now turning to FIGS. 4 and 5, these figures respectively illustrate example transmit and receive channels or paths for individual transmit and receive antennas 206A, 206B, 208A, 208B in transceiver 202A (it being understood that similar components may be used for other transceivers such as transceiver 202B). While the techniques described herein may be applicable to pulse modulated radar sensors or any other types of radar sensors, the illustrated implementations will focus on MIMO radar sensors that utilize millimeter wave frequency modulated continuous wave (FMCW) radar signals.

In the transmit channel of transceiver 202A as illustrated in FIG. 4, a local oscillator (LO) 230 generates an FMCW radio frequency (RF) signal, e.g., in the range of 76 GHz to 81 GHz. The FMCW RF signal is amplified by an amplifier 232 to drive a transmit antenna 206A. The frequency of LO 230 is determined by a modulator block 234, which is capable of frequency modulating LO 230 to effectively generate pulsed signals or sweep signals referred to as chirps, e.g., using sawtooth or another form of frequency modulation. Control over modulator block 234 may be provided by a controller 236, which in some instances may be controller 204, while in other instances may be other control logic, e.g., as may be integrated into transceiver 202A. Controller 236 may be used to control various parameters of the chirps, e.g., start frequency, phase, chirp rate, etc., as well as to trigger the initiation of a chirp.

In the receive channel of transceiver 202A as illustrated in FIG. 5, a received RF signal from an antenna 208A is amplified by an amplifier 238 and then mixed with the LO 230 signal by a mixer 240 to generate a mixed signal. The mixed signal is filtered by a filter 242 and digitized by an analog to digital converter (ADC) 244 to generate a stream of digital signals. For example, the digital signals can be data samples, which in the illustrated implementation may be considered to be digital values output by ADC 244, and which may in some implementations include other identifying data such as the channel, transmit antenna, receive antenna, chirp number, timestamp, etc. associated with the digital value. The digital signals are provided to controller 236.

It will be appreciated that in different implementations, various components among components 230-244 of FIGS. 4 and 5 may be shared by multiple transmit channels or multiple receive channels and that multiple instances of some components may be dedicated to different channels. Further, other architectures may be used to implement transmit channels or receive channels in other implementations, so the invention is not limited to the specific architecture illustrated in FIGS. 4-5. In addition, in some implementations, controller 236 may be replaced by controller 204 of radar sensor 200. In these implementations, controller 204 of radar sensor 200 may control one or more components of components 230-244 described with reference to FIGS. 4 and 5.

Figure 6:
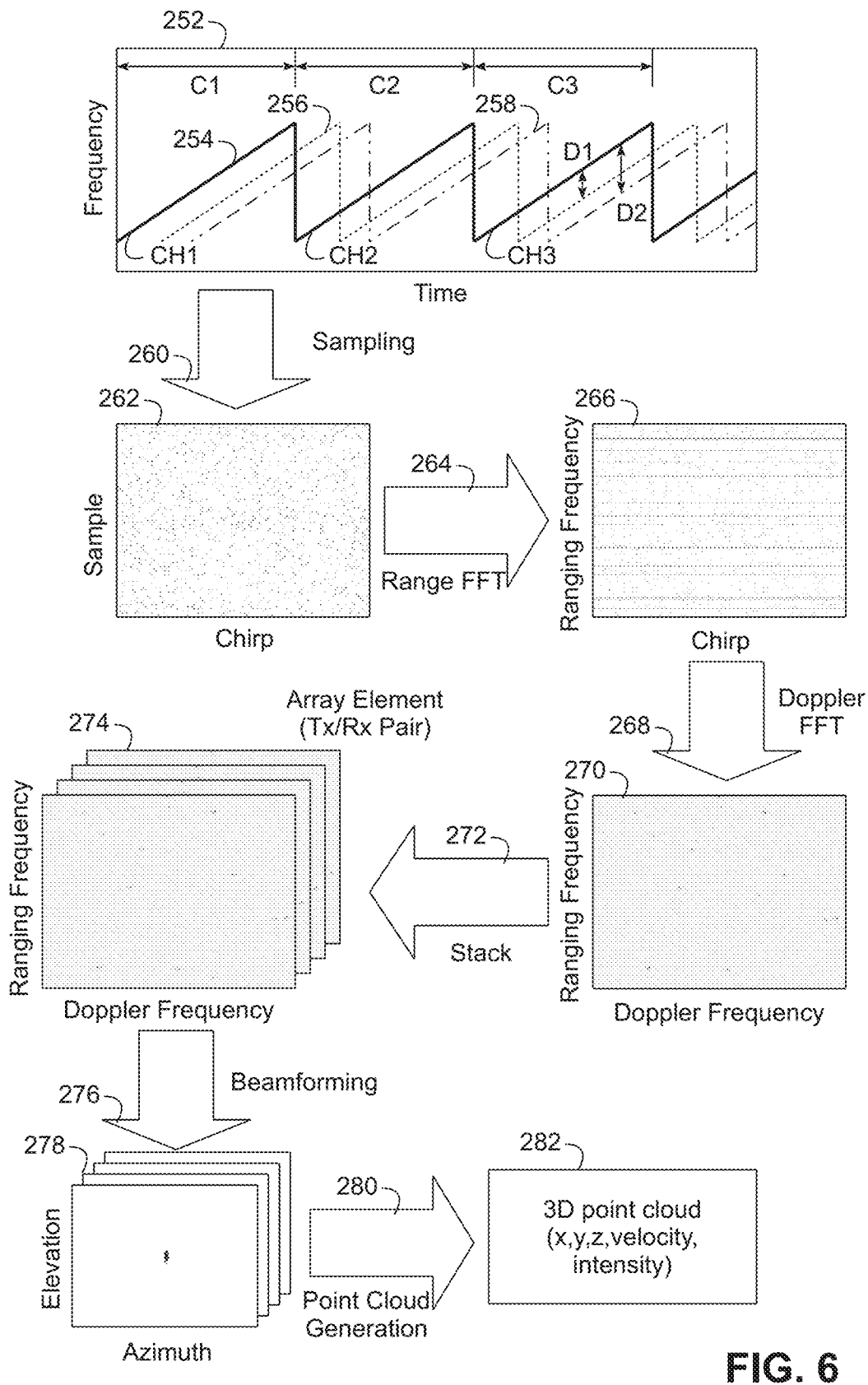
FIG. 6 illustrates an example process for sensing targets in an environment with various implementations disclosed herein.

FIG. 6 next illustrates diagrams showing general operations of a radar sensor and data generated by the radar sensor. For example, the radar sensor may be an FMCW MIMO radar sensor such as radar sensor 200 discussed above in connection with FIGS. 2-5. Graph 252, for example, illustrates a simplified time vs. frequency graph of a sequence of chirps. A chirp may represent a sweeping signal across frequency in a certain cycle. For example, a chirp CH1 is a sweeping signal during cycle C1, a chirp CH2 is a sweeping signal during cycle C2, and a chirp CH3 is a sweeping signal during cycle C3. In this example, chirps CH1-CH3 are illustrated as repetitions of sweeping signals having the same shape. However, in some implementations, chirps may dwindle over time. In addition, in this example graph, chirps C1-C3 are linearly modulated to have a sawtooth shape. However, in some implementations, the chirps may be modulated non-linearly or may be modulated to have any shape. Graph 252 shows both a transmitted signal 254 (which matches the frequency of the local oscillator) for a transmit channel Tx and received signals 256, 258 for two targets located at difference ranges and received by a receive channel Rx. In this example, the transmitted signal 254 represents a sequence of chirps. As shown in this graph, the time delay from transmission of the transmit signal to being received for the two targets causes a difference in frequency, e.g., illustrated by D1 for a first target and D2 for a second target.

In some implementations, data samples collected by radar sensor 200 may be processed to generate radar data associated with certain features. For example, the radar data may be represented as data cubes associated with certain features. The features may be represented as dimensions of the data cubes where the features include, but are not limited to, fast time (the number of samples in one chirp), slow time (the number of chirps in one set of chirps), and the number of receive channels. Where a local oscillator is operated at about 77 GHz, a controller (e.g., controller 204 in FIG. 2 or controller 236 in FIGS. 4 and 5) may process received data samples such that each frame may include 128-512 chirps and 512-1024 samples per chirp. In this example, a frame firing duration (also referred to as a coherent processing interval (CPI) may be about 5-15 ms/frame, a sample rate may be about 20 million samples/second, and a chirp duration may be about 25-100 microseconds per chirp. In some implementations, receive channels (e.g., about 4-16 Rx channels) may be processed in parallel. Although specific numbers are provided in this paragraph, they are provided as examples and any suitable numbers can be used to implement radar sensors.

Radar data (e.g., data cubes) may be processed to determine, for one or more targets in the field of view of a radar sensor, (i) range from the radar sensor to a respective target, (ii) Doppler velocity (i.e., radial velocity of the respective target relative to the radar sensor), or (iii) angle of arrival, in terms of one or both of azimuth and elevation. First, as illustrated at 260, sampling may be performed on each receive channel over multiple chirps in a frame or CPI. The samples for all of the chirps in the frame for a particular Tx/Rx pair may be incorporated into a two dimensional array 262 where the samples are arranged in one dimension by sample number (vertical axis of FIG. 6, from first sample to last sample collected for each chirp) and in another dimension by chirp number (horizontal axis of FIG. 6, from first chirp to last chirp in a frame). In one example implementation, for example, where a frame includes 128 chirps with 1024 samples in each chirp, the array may have dimensions of 128 (horizontal)×1024 (vertical).

Next, range measurements are determined for the samples in each channel, generally by performing a Fast Fourier Transform (FFT) operation 264 (referred to herein as a range FFT), or other frequency transformation, which recovers the frequency spectrum from the digital samples in each channel to generate a range profile (power vs. range) in the frequency domain for each chirp for a particular Tx/Rx pair. It will be appreciated, in particular, that a target at a given range from a radar sensor will delay the transmitted signal 254 by a delay that is proportional to its range, and that this delay remains substantially constant over a chirp. Given that the mixed signal output by mixer 240 of FIG. 5 is effectively the difference in the instantaneous frequencies of the transmitted and received signals within a given channel, and that this difference is substantially constant over a chirp, the reflection corresponding to the target effectively generates a constant frequency "tone" in the mixed signal that resolves to a peak in the frequency domain at that frequency. Multiple targets therefore resolve to a range profile having different peaks in the frequency domain corresponding to the ranges of those targets, and may be grouped in some implementations into frequency bins corresponding to different ranges in the field of view of the radar sensor.

Each range profile for a particular chirp may be considered to be a one dimensional array representing power over a range of frequencies for that chirp. The range profiles for the chirps in the frame may therefore also be stacked into an array 266 having one dimension representing ranging frequency or frequency bin (vertical axis in FIG. 6) and one dimension representing chirp number (horizontal axis in FIG. 6), and it may be seen by the representation of array 266 that horizontal lines generally represent frequency bins where potential targets at various ranges corresponding to those frequency bins have been detected over the course of multiple chirps in a frame.

Next, velocity measurements (e.g., Doppler measurements) are determined for the samples in each channel, generally by performing a second FFT operation 268 (referred to herein as a Doppler FFT) to recover phase information corresponding to Doppler shifts. Transforming across the set of chirps results in a data set that may be represented by an array 270 arranged by ranging frequency or frequency bin (vertical axis) and Doppler frequency or frequency bin (horizontal axis), where each Doppler frequency bin generally corresponds to a particular velocity for a potential target disposed within a particular range frequency bin.

Next, beamforming is performed to determine angle of arrival information. It should be noted that arrays 262, 266 and 270 are each based on the samples for a single transmit channel/receive channel (Tx/Rx) pair. Thus, a stacking operation 272 may be performed to stack the arrays 270 generated by the Doppler FFT operation for different Tx/Rx pairs (also referred to as array elements) into a data stack 274.

It will be appreciated that each different Tx/Rx pair may have a different spatial relationship between the respective physical transmit and receive antennas for the pair, which can lead to slightly different phases reported for the same target for different Tx/Rx pairs. In the case of a uniform linear array, a third FFT operation 276 (referred to herein as a beamforming FFT) may therefore use the set of values across the different array elements in stack 274 (also referred as a beamvector) to estimate an angle of arrival at each range-Doppler location (i.e., each combination of range frequency bin and Doppler frequency bin). More generally, a set of complex responses expected for some set of azimuth and elevation angles of arrival, also known as steering vectors, may be multiplied onto the beamvectors to generate azimuth and elevation angles for each target (represented by graphs 278).

Then, the aforementioned range, Doppler and angle of arrival information may be combined in some implementations by a point cloud generation operation 280 into a three dimensional point cloud 282 including estimated position (e.g., using cartesian or polar coordinates), velocity, and signal intensity (or confidence) for a plurality of targets in the field of view of the radar sensor.

It will be appreciated that a wide variety of modifications and enhancements may be made to the aforementioned operations of FIG. 6, so the invention is not limited to this specific sequence of operations.

Those skilled in the art, having the benefit of the present disclosure, will recognize that the exemplary environment illustrated in FIGS. 1-6 is not intended to limit implementations disclosed herein. Indeed, those skilled in the art will recognize that other alternative hardware or software environments may be used without departing from the scope of implementations disclosed herein. It will also be appreciated that the various MIMO radar techniques described herein may be utilized in connection with other applications, so the invention is not limited to MIMO radars or radar sensing systems used solely in connection with the control of an autonomous vehicle.

Mixed Multiple Input Multiple Output (MIMO) Radar Sensor

As noted above, multiple input multiple output (MIMO) radar generally refers to a radar that utilizes multiple transmitters and multiple receivers. Assuming for the purposes of this explanation that each transmitter has an associated transmit (Tx) antenna and each receiver has an associated receive (Rx) antenna (although the invention is not so limited), through the use of various signal processing techniques known to those of ordinary skill, the angular resolution of a MIMO radar sensor with M Tx antennas and N Rx antennas (and thus a total of M+N antennas) can generally be made equivalent to that of a non-MIMO radar sensor with M×N antennas. MIMO radar can therefore often improve the angular resolution of a radar in a relatively cost-effective method.

In this regard, the term transmitter is used herein to generally refer to one or both of hardware and software in a radar sensor that transmits a particular radar signal, and may in some instances include various components associated with generating the radar signal as well as various components associated with emitting that radar signal as electromagnetic energy, including one or both of digital and analog components, as well as the actual antenna(s) used to emit the electromagnetic energy. Similarly, the term receiver is used herein to general refer to one or both of hardware and software in a radar sensor that is capable of receiving and at least partially processing electromagnetic energy received by any antenna(s) coupled thereto, including one or both of digital and analog components, as well as the actual antenna(s) used to receive the electromagnetic energy. A transmitter or a receiver may, in some instances, be considered to include any antenna(s) used to emit or receive electromagnetic energy, while in other instances, a transmitter or a receiver may be considered to not include any antenna, e.g., where the transmitter or receiver is coupled to an external antenna. In addition, it will be appreciated that the terms transmitter and receiver may also be considered in some instances to be synonymous with the terms transmit channels and receive channels, so it will be appreciated that the same hardware or software may implement multiple transmitters or transmit channels or multiple receivers or receive channels in some implementations.

In addition, for the purposes of the disclosure, a transmitter may be considered to generate a radar signal and a receiver may be considered to receive a radar signal, and in some instances, a receiver may be considered to receive a particular radar signal generated by a transmitter. Nonetheless, where a receiver receives a radar signal generated by a transmitter, generally that radar signal will have been modified to the extent that the received radar signal will generally represent that portion of a transmitted radar signal that has reflected off of one or more targets in a field of view or scene of the radar sensor.

A MIMO radar generally operates by using the same set of receivers to process signals from the transmissions of multiple transmitters. As such, receivers are generally required to incorporate functionality to separate or otherwise discriminate between the signals from different transmitters (e.g., by having multiple transmitters transmit orthogonally in some manner). Three different conventional approaches used to achieve this separation include time division multiplexing (TDM), Frequency Division Multiplexing (FDM), and code division multiplexing (CDM).

With a TDM approach, a radar sensor transmits using a single transmitter for some given time and then switches to another transmitter, such that the transmitters effectively transmit in a time-interleaved pattern. One example implementation interleaves transmission from transmitter to transmitter on a chirp by chirp basis. This approach, however, has three major drawbacks. First, the achievable signal-to-noise ratio (SNR) of received signals from a TDM approach will generally be reduced by a factor equal to the number of transmitters compared to the FDM or CDM approaches since the transmitters can only be activated sequentially. Second, the maximum unambiguous velocity is generally reduced by a factor equal to the number of transmitters. Third, the scan time generally increases by the number of transmitters since each transmitter generally must have enough time to transmit within its own window.

With an FDM approach, multiple transmitters are generally active at the same time, but with each transmitter occupying a different frequency band. At the same time, multiple receivers remain active to receive the transmitted signals in the various frequency bands, with band pass filtering used to discriminate between the different transmitted signals. Such an approach, however, has a significant drawback given that the approach occupies the signal bandwidth at the transmitter and the receiver in a manner that is linearly proportional to the number of transmitters.

With a CDM approach, multiple transmitters transmit simultaneously and within the same frequency band, with unique digital codes assigned to each transmitter to encode waveform phases. The transmitters' signals are then separated within a receiver by decoding the digital codes. Such an approach generally requires more digital processing but also generally avoids the aforementioned issues with the TDM and FDM approaches by improving unambiguous velocity and increasing signal SNR, as well as supporting relatively higher update rates.

Various types of digital codes may be used to encode transmitter signals, and provide various levels of cross-correlation performance, which generally determines the amount of interference from different transmitters using different codes. One type of digital code is referred to as a Hadamard code, which ensures minimum leakage in the MIMO decoding process when transmitter signals are separated at the receivers. However, decoding Hadamard codes generally requires an accumulation of multiple chirps for zero cross-correlation between channels, which reduces the maximum unambiguous velocity by a factor equal to the number of transmitters, and cross-correlation leakage among channels using Hadamard codes generally gets more severe with relatively faster moving targets due to Doppler phase shift along chirps from target movement, which generally destroys the zero cross-correlation properties. Another type of digital code is referred to as a pseudo-random code, which generally relies on a pseudo-random sequence having a very large period that makes the pseudo-random code appear to be a random sequence. The starting phase of each transmitter is updated per chirp with its own unique random phase code, and cross-correlation performance is generally determined by the code length. However, it has been found that channel isolation performance generally relies on the sequence length, and can never achieve zero cross-correlation no matter how long the sequence length is, and that intensive computational loads are generally involved in a random-sequence decoding process. In particular, prior to Doppler compression on a given receiver channel, the inverse of the phase code for a given transmitter is multiplied across the chirps (slow time) in the sequence, and the range-Doppler space resolved after this step will generally be unique to that transmitter/receiver (Tx/Rx) pair such that the process must be repeated for all Tx/Rx pairs.

Yet another approach that may be used to encode transmitter signals utilizes Doppler-division codes. With Doppler-division code modulation, the starting phase of each transmitter is updated per chirp with a constant phase increment unique to that transmitter, and on each receiver, the range-Doppler space is resolved such that every transmit signal will show up in the range-Doppler space at a unique Doppler shift. Different transmitters generally use different chirp to chirp phase steps. An exemplary but by no means exclusive Doppler-division code, for example, may use phase steps [0, 15, 12, 4, 13, 10, 1, 14, 7, 6, 8, 5]*2*π/16 for 12 transmitters, and phase shifts for chirps from (0:M−1) may therefore be coded by (phase_step)*[0:M−1].

By using different phase steps for each transmitter, a target will generally be Doppler shifted to different Doppler bins from the slow-time spectral analysis, which may therefore provide suitable separation among different transmitters. A particular target's Doppler can generally be extracted by finding maximum peak from correlating with the location of a transmitter's ideal spectral pattern.

Doppler-division codes generally avoid a number of shortcomings of the other aforementioned digital code techniques, as Doppler-division codes generally provide zero cross-correlation among transmitters, i.e., zero channel isolation, as well as provide a maximum unambiguous velocity that is generally independent of the number of transmitters. Moreover, the computational load from decoding Doppler-division codes generally scales with the number of receivers whereas, for example, decoding pseudo-random sequences generally scales as the product of the number of transmitters and the number of receivers. Further, the zero channel isolation feature from Doppler-division codes is generally not impacted by target speed.

However, one issue raised by the use of Doppler-division codes is that a possibility exists that a second target's correlating-and-accumulating peak may overlap with a side lobe of the first target, and if the second target's peak is lower than the first target's sidelobe, the second target will not be detected. Moreover, the risk of causing such a false negative problem increases with more transmitters encoded with Doppler-division codes and more targets being present in the field of view of the radar sensor.

To address the aforementioned shortcomings of the aforementioned MIMO approaches, the herein-described implementations utilize what is referred to herein as a "mixed" MIMO technique that uses a combination of Doppler-division codes and additional "sub-set" codes, e.g., pseudo-random codes in the illustrated implementations, for MIMO transmitter phase coding, in particular for encoding signals transmit by individual transmitters and decoding signals received by receivers in a MIMO radar sensor.

In particular, in some implementations, different Doppler-division codes may be applied to different transmitters in various sub-sets of transmitters among the multiple transmitters in a MIMO radar sensor, and then a different pseudo-random code sequence may be applied to all of the transmitters within each sub-set of transmitters. In one implementation, for example, sub-sets may be defined for different MIMO radar transceiver devices, such that different transmitters from the same MIMO radar transceiver device (e.g., a radar monolithic microwave integrated circuit (MMIC) chip) may be coded by different Doppler-division codes. Then, a pseudo-random code sequence may be applied on all of the transmitters from the same MIMO radar transceiver device, with different pseudo-random sequences used for different MIMO radar transceiver devices.

As will become more apparent below, the sub-set digital codes may be used in part to group together sub-sets of one or more transmitters from the MIMO radar sensor to better balance channel isolation with computational overhead. The manner in which transmitters are partitioned may be defined in a number of different manners in different implementations. In addition, the partitioning of transmitters into sub-sets may be static and invariant in some implementations, while in other implementations, the partitioning of transmitters into sub-sets may be dynamic, and may be configured or customized at runtime based upon various considerations, and in some instances, may be reconfigured during runtime based on changing considerations occurring during operation of a radar sensor.

As noted above, in some implementations that support multiple MIMO radar transceiver devices, the sub-sets of transmitters may be defined to group together all of the transmitters on each MIMO radar transceiver device. However, in other implementations, sub-sets may be defined based upon a number of different hardware, software, performance, sensor or other considerations, including considerations such as the computational overhead, the number of targets in the field of view of a radar sensor (i.e., the scene sensed by the radar sensor), the complexity of the scene, the velocity of targets, the velocity of the radar sensor, whether the radar sensor is forward, side or rear facing on a moving platform such as an automobile, or other application or runtime-related considerations that may impact the potential for interference or clutter within range-Doppler space or undesirable consumption of computational resources. It will also be appreciated that a sub-set of transmitters may span multiple hardware devices (e.g., transceiver devices, chips, packages, modules, etc.) in some implementations, while in other implementations, a single hardware device (e.g., a transceiver device, chip, package, module, etc.) may support multiple sub-sets of transmitters. Sub-sets also need not contain the same number of transmitters in some implementations, and in some implementations, Doppler shifts within each subset may be unique to further minimize false positives.

Such a coding scheme may reduce the possibility of false negatives by only allowing transmitters within a given sub-set (e.g., a single MIMO radar transceiver device in the illustrated implementations) to be counted in the above sidelobe-hiding-target cases. Furthermore, reductions in computational complexity are still realized relative to approaches such as full pseudo-random coding due to the fact that the range-Doppler space generally need not be resolved uniquely for each Tx/Rx pair, but instead may be resolved uniquely only for the individual sub-set codes/transmitters.

As such, in some implementations, control logic may be employed in a radar sensor to encode or decode radar signals using a mixture of sub-set digital codes that discriminate between different sub-sets of MIMO transmitters of the plurality of MIMO transmitters and Doppler-division codes that discriminate between different MIMO transmitters within particular sub-sets of MIMO transmitters.

Figure 7:
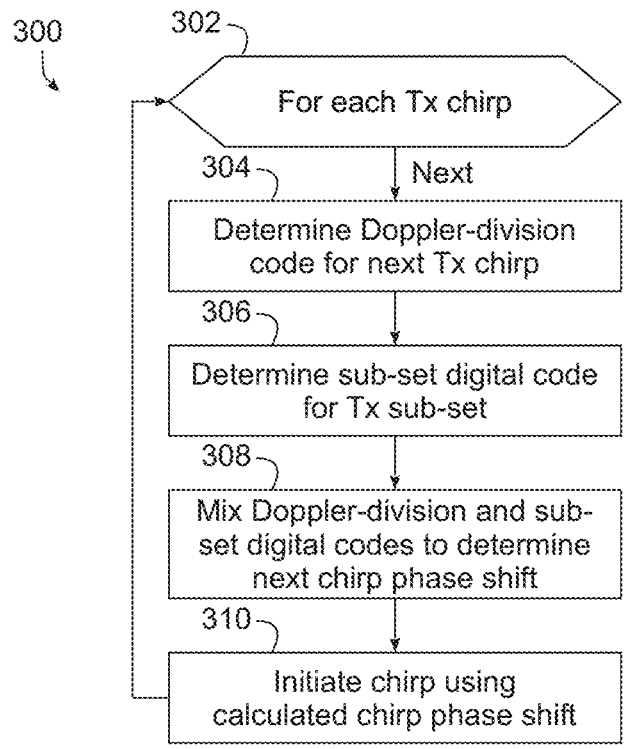
FIGS. 7 and 8 illustrate an example implementation of a method for sensing objects in an environment using mixed MIMO encoding and decoding in the MIMO radar system of FIG. 2, with FIG. 7 illustrating transmitter-related operations and FIG. 8 illustrating receiver-related operations associated therewith.

Now turning to FIG. 7, this figure illustrates at 300 an example sequence of operations for a transmitter in a MIMO radar sensor such as radar sensor 200 of FIG. 2. In this example implementation, radar signals are emitted as FMCW chirps, and a combination of Doppler-division codes and sub-set digital codes are used to control a phase shift or delay in the initiation of each chirp. Moreover, it will be appreciated that multiple transmitters are generally present in radar sensor 200 and are configured to concurrently generate chirps, with decoding performed by each MIMO receiver in the sensor to discriminate between the chirps initiated by the different transmitters. As such, the sequence of operations illustrated in FIG. 7 may be concurrently executed by multiple transmitters in the illustrated implementations, with different phase shifts utilized for each chirp to enable the chirps initiated by each transmitter to be detected by each receiver.

In addition, in the illustrated implementation, transmitters are allocated to sub-sets according to the particular MIMO radar transceiver 202 upon which each transmitter resides. As such, for a radar sensor including 1 . . . N MIMO radar transceiver 202, N sub-sets of transmitters may be defined, with each sub-set including all of the transmitters on the associated MIMO radar transceiver 202. As noted above, however, transmitters may be allocated to different sub-sets in other manners in other implementations. In some implementations, each MIMO radar transceiver 202 may be considered to be a MIMO radar transceiver device implemented as a MIMO transceiver integrated circuit chip or package having one or more transmit (Tx) antennas or channels and one or more receive (Rx) antennas or channels, and such a device may be disposed on one or more integrated circuit devices or chips, may or may not be incorporated into a common package or module, and may or may not have antennas integrated directly therewith.

In particular, for each transmitter (Tx) chirp generated by the transmitter (block 302), both a Doppler-division code (block 304) and a sub-set digital code, e.g., a pseudo-random code (block 306) are determined for the chirp. Then, in block 308, the Doppler-division and sub-set digital codes are mixed together to determine a phase shift for the chirp, and in block 310 the chirp is initiated using the phase shift for the chirp as calculated in block 308, thereby causing the chirp to be emitted by a transmit antenna associated with the transmitter.

In the illustrated implementation, for example, sub-set digital codes may be selected from pseudo-random sequences that are unique for each of a plurality of MIMO transmitter sub-sets. Put another way, each sub-set of transmitters may utilize a different pseudo-random sequence in some implementations, although in other implementations, all of the sub-sets of transmitters may use pseudo-random codes chosen from the same pseudo-random sequence. Other types of sub-set digital codes may be used in other implementations, including, for example, any binary or multi-phase codes that feature low cross-correlation sidelobes, m codes, apas, etc.

Similarly, Doppler-division codes may be selected from various sequences, and while in some instances the same sequences may be used for each sub-set, in other instances, different sequences may be used for each sub-set.

In addition, in the illustrated implementation, each sub-set digital code and each Doppler-division code is associated with a particular delay or phase shift, and mixing of the codes in block 308 may be implemented by summing together the delays or phase shifts associated with the sub-set and Doppler-division codes selected for a particular chirp in order to determine an overall delay or phase shift. Then, the initiation of a chirp in block 310 may apply the calculated delay or phase shift to effectively delay the initiation of the chirp relative to some trigger signal used to coordinate the initiation of chirps by all of the transmitters in the MIMO radar sensor. Thus, upon triggering of a chirp cycle in the MIMO radar sensor, each transmitter therein will delay its chirp a different, predetermined amount relative to the trigger signal based upon the calculations performed in blocks 304-308.

As such, it will be appreciated that each sub-set digital code effectively identifies the sub-set to which a particular transmitter is assigned, while each Doppler-division code effectively identifies the particular transmitter within the particular sub-set to which the that transmitter is assigned, thereby effectively enabling a receiver to discriminate both between different sub-sets of transmitters and between different transmitters within each sub-set.

Figure 8:
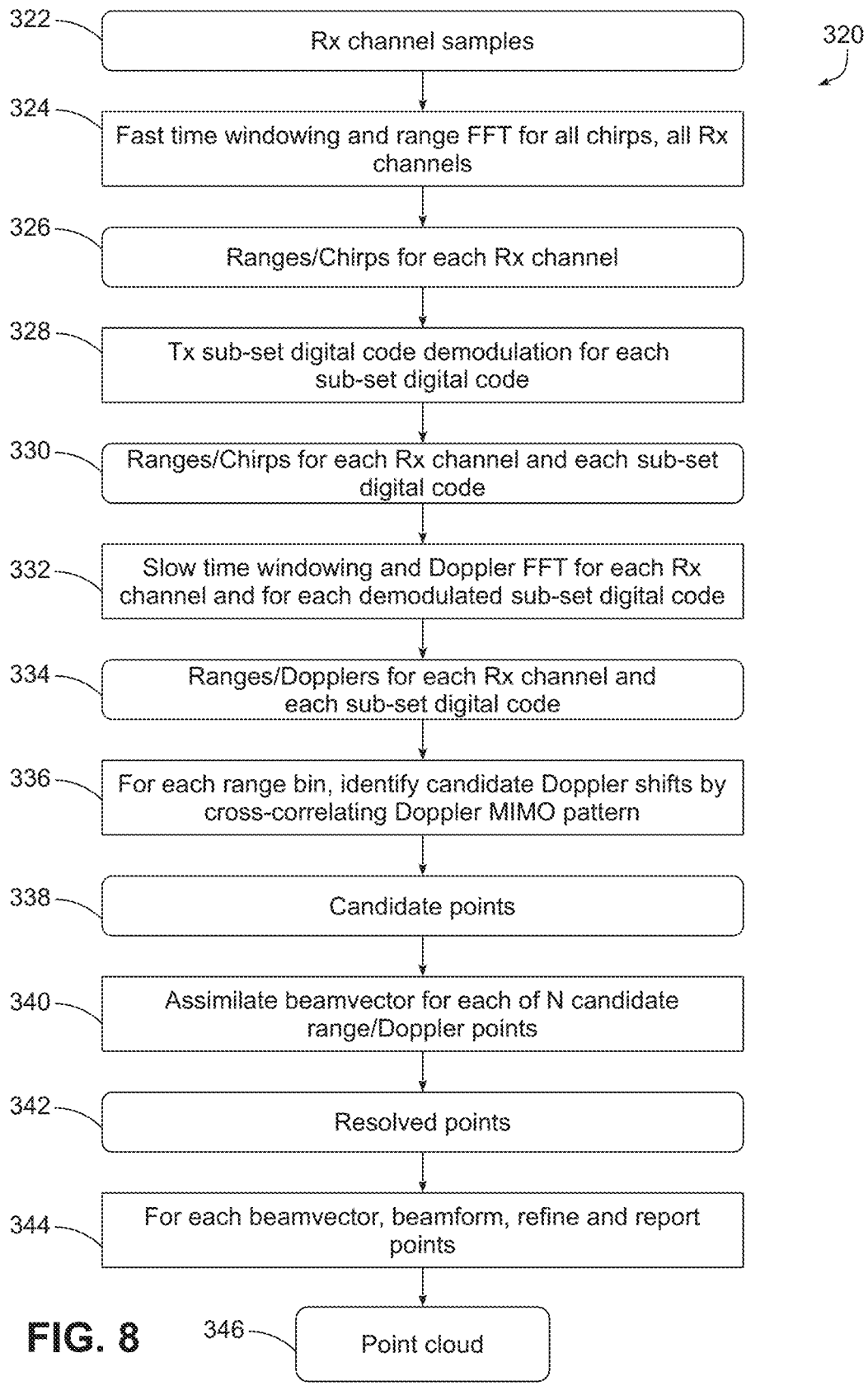

Now turning to FIG. 8, this figure illustrates at 320 an example joint sequence of operations for processing the radar signals received by all of the receivers in a MIMO radar sensor such as radar sensor 200 of FIG. 2, e.g., responsive to sensing radar signals generated by the various transmitters in the radar sensor in the manner discussed above in connection with FIG. 7. In this flow, data received by all of the receivers is jointly processed, with the data specific to each receiver (i.e., the data based upon the radar signal received by a particular Rx antenna) being referred to as a receive (Rx) channel. However, it will be appreciated that at least a portion of the signal processing functionality disclosed herein may be partitioned among the control logic of each transmitter in some implementations, and as such, it is not necessary that all Rx channels be jointly processed in some implementations.

As illustrated in block 322, receiver channel samples, which may represent the digital format sampled data generated as a result of downconverting and sampling the radar signal received by the Rx antenna associated with the receiver in the manner discussed above in connection with FIGS. 2-6, may be received as input, and in block 324 fast time windowing and a range transformation (e.g., a range Fast Fourier Transform (FFT) operation) may be performed for all chirps, and for all Rx channels, which generates slow time radar data in the form of ranges/chirps for each Rx channel (block 326).

Next, in block 328, demodulation of the slow time radar data is performed for each sub-set digital code, thereby effectively discriminating between the different sub-sets of transmitters. Doing so generates ranges/chirps for each Rx channel and for each sub-set digital code (block 330), which is also referred to herein as sub-set partitioned slow time radar data. It will be appreciated that the sub-set digital codes, as well as the Doppler-division codes, used to generate each chirp by each transmitter are generally provided to or otherwise known by the receiver(s) of the radar sensor, and that control logic may be provided in some implementations to coordinate the exchange of codes to enable the chirps generated by each transmitter to be appropriately identified when performing signal processing on the Rx channels.

Next, in block 332, slow time windowing and a Doppler transformation (e.g., a Doppler FFT operation) may be performed for each Rx channel and for each demodulated sub-set digital code. Doing so generates ranges/Dopplers for each Rx channel and for each sub-set digital code (block 334), which is also referred to herein as sub-set partitioned Doppler radar data.

Next, in block 336, the sub-set partitioned Doppler radar data is demodulated using the Doppler-division codes for the transmitters within each of the sub-sets, in particular by, for each range bin, identifying candidate Doppler shifts by cross-correlating Doppler MIMO patterns, resulting in the generation of a set of candidate points (block 338). Thereafter, signal processing occurs in a similar manner to that described above in connection with FIG. 6. In particular, beamvectors for each of the candidate range/Doppler points are assimilated in block 340 to generate a set of resolved points (block 342), and for each beamvector, beamforming, refinement and reporting is performed in block 344, resulting in the output of a point cloud 346, or other suitable data representation. In some implementations, for example, the point cloud 346 may effectively identify one or more targets that reflect the radar signals generated by the various transmitters and received by the receivers in the MIMO radar sensor.

It will be appreciated that, in contrast to a conventional CDM approach, where slow time windowing and Doppler transformations is generally performed for all Tx/Rx pairs, blocks 332 and 336 of FIG. 8 are performed on sub-set partitioned data. As such, the computational overhead associated with blocks 332 and 336 is generally lower than a conventional CDM approach. Moreover, as compared to a purely Doppler-division code approach, the amount of filter sidelobe peaks, and hence the above mentioned false negative possibilities, present within each sub-set partitioned data is substantially reduced when performing cross-correlation of Doppler MIMO patterns. In addition, this advantage is particularly relevant when MIMO channel counts get very high. Considering, for example, that 512 chirps=512 Doppler bins, a Doppler MIMO mapping of 12 transmitters into such a space may produce greater than 100 filter sidelobe peaks.

Figure 9:
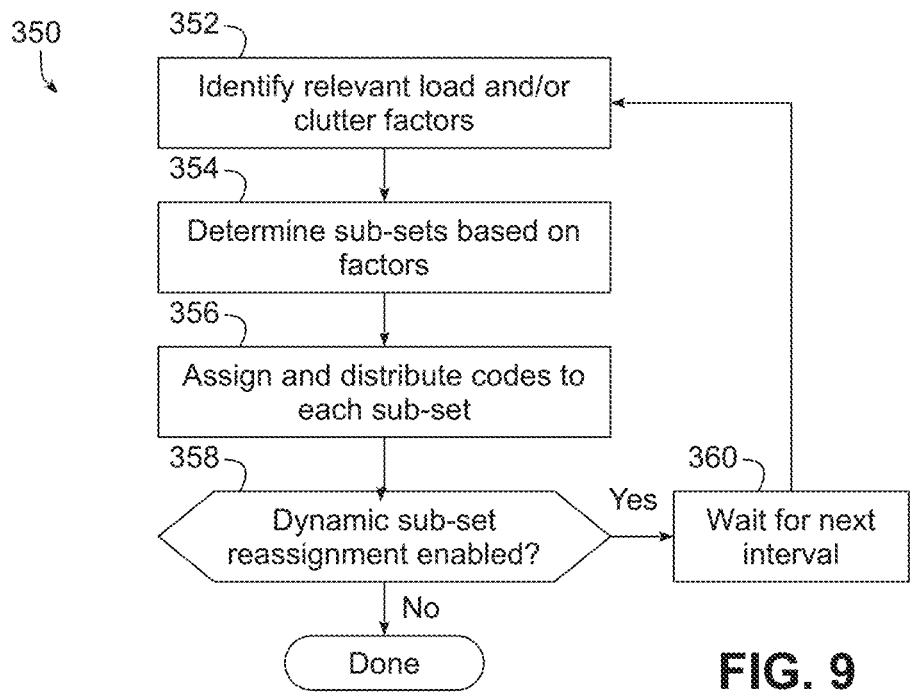
FIG. 9 illustrates an example implementation of a sub-set partitioning process using the MIMO radar system of FIG. 2.

Now turning to FIG. 9, as noted above, the manner in which transmitters may be partitioned into sub-sets may vary in different implementations. In some implementations, for example, the sub-sets may be dynamically generated during runtime of the radar sensor, and while in some implementations the sub-sets may be dynamically generated during initialization and may thereafter remain static and invariant during the remaining runtime of the radar sensor, in other implementations MIMO transmitters may be dynamically reassigned to different sub-sets during runtime, e.g., in response to more runtime conditions. As noted above, for example, runtime conditions such as the complexity of a scene, the number of targets, the velocity of different targets, the velocity of the radar sensor, the direction in which a radar sensor faces (e.g., relative to a vehicle upon which it is mounted in an automotive application), etc. may impact the amount of clutter that may exist in the range-Doppler space. Moreover, computational load may vary in different instances, so it may be desirable to assign, and in some instances, reassign, transmitters to different numbers or sizes of sub-sets. In other implementations, however, the sub-sets may be fixed and invariant, whereby no runtime assignment of transmitters to sub-sets may be performed.

FIG. 9, for example, illustrates a sequence of operations 350 that may be executed during runtime of radar sensor 200, e.g., during initialization. Block 352 may identify one or more load or clutter factors that may impact the optimal sizes or numbers of sub-sets, and block 354 may then determine the sub-sets to be used based upon the aforementioned factors. Block 356 may then assign each transmitter to a sub-set as determined in block 354. In addition, at this time one or both of the sub-set digital codes and Doppler-division codes may be generated and distributed to enable suitable encoding and decoding to be performed based upon the current assignment of transmitters to sub-sets.

Then, a determination may be made in block 358 as to whether dynamic sub-set reassignment is supported or enabled. If not, the sequence is complete, as the sub-sets have been suitably established. If, however, dynamic reassignment is supported and enabled, control may pass to block 360 to wait for a next evaluation interval, and when the next interval is reached, control may return to block 352 to dynamically re-evaluate current load or clutter factors to determine if any adjustments to the assignments of sub-sets may be warranted. As such, a radar sensor may periodically reconfigure the sub-sets to optimize radar sensor operation in some implementations.

Other variations will be apparent to those of ordinary skill. Therefore, the invention lies in the claims hereinafter appended.

What is claimed is:

1. A radar sensor, comprising:
   one or more multiple input multiple output (MIMO) receivers configured to receive radar signals generated by a plurality of MIMO transmitters; and
   control logic coupled to the one or more MIMO receivers, the control logic configured to decode the received radar signals using a mixture of sub-set digital codes that discriminate between a plurality of sub-sets of MIMO transmitters of the plurality of MIMO transmitters and Doppler-division codes that discriminate between different MIMO transmitters within each of the plurality of sub-sets of MIMO transmitters such that, for a particular MIMO transmitter of the plurality of MIMO transmitters, a sub-set digital code associated therewith identifies a particular sub-set to which the particular MIMO transmitter is assigned and a Doppler-division code associated therewith identifies the particular MIMO transmitter within the particular sub-set to which the particular MIMO transmitter is assigned.

2. The radar sensor of claim 1, wherein the radar signals generated by the plurality of MIMO transmitters include a plurality of frequency modulated continuous wave (FMCW) chirps, and wherein the control logic is configured to, for a first MIMO receiver in the one or more MIMO receivers:
   perform range transformation over a plurality of chirps received by the first MIMO receiver to generate slow time radar data;
   demodulate the slow time radar data using sub-set digital codes associated with the plurality of sub-sets of MIMO transmitters to generate sub-set partitioned slow time radar data;
   perform Doppler transformation on the sub-set partitioned slow time radar data to generate sub-set partitioned Doppler radar data; and
   demodulate the sub-set partitioned Doppler radar data using Doppler-division codes for the transmitters within each of the plurality of sub-sets of MIMO transmitters.

3. The radar sensor of claim 1, wherein the sub-set digital codes are pseudo-random digital codes selected from pseudo-random code sequences associated with each of the plurality of sub-sets of MIMO transmitters.

4. The radar sensor of claim 1, wherein the plurality of MIMO transmitters are disposed on a plurality of MIMO radar transceiver devices, and wherein the MIMO transmitters disposed on each MIMO radar transceiver device are in the same sub-set of MIMO transmitters.

5. The radar sensor of claim 1, wherein the control logic is further configured to generate the plurality of sub-sets of MIMO transmitters during runtime of the radar sensor.

6. The radar sensor of claim 1, wherein the control logic is configured to reassign MIMO transmitters to sub-sets during runtime of the radar sensor in response to one or more runtime conditions.

7. The radar sensor of claim 1, wherein the control logic is configured to decode a first radar signal generated by a first MIMO transmitter of the plurality of MIMO transmitters using a first sub-set digital code that identifies a first sub-set of the plurality of sub-sets of MIMO transmitters to which the first MIMO transmitter is assigned and a first Doppler-division code that identifies the first MIMO transmitter within the first sub-set.

8. The radar sensor of claim 1, wherein the sub-set digital code associated with the particular MIMO transmitter defines a first phase shift, the Doppler-division code associated with the particular MIMO transmitter defines a second phase shift, and a phase shift of a chirp in a radar signal generated by the particular MIMO transmitter has a phase shift that is controlled to be a sum of the first and second phase shifts.

9. The radar sensor of claim 1, wherein the control logic is further configured to identify one or more targets in a field of view of the radar sensor using the received radar signals decoded using the mixture of sub-set digital codes and Doppler-division codes.

10. The radar sensor of claim 1, wherein the control logic is further configured to generate a point cloud for a field of view of the radar sensor using the received radar signals decoded using the mixture of sub-set digital codes and Doppler-division codes.

11. The radar sensor of claim 1, wherein the received radar signals include reflected signals generated by reflection of transmitted radar signals transmitted by the plurality of MIMO transmitters off of one or more targets in a field of view of the radar sensor.

12. A radar sensor, comprising:
one or more multiple input multiple output (MIMO) receivers configured to receive radar signals generated by a plurality of MIMO transmitters, wherein the radar signals generated by the plurality of MIMO transmitters include a plurality of frequency modulated continuous wave (FMCW) chirps; and
control logic coupled to the one or more MIMO receivers, the control logic configured to decode the received radar signals using a mixture of sub-set digital codes that discriminate between a plurality of sub-sets of MIMO transmitters of the plurality of MIMO transmitters and Doppler-division codes that discriminate between different MIMO transmitters within each of the plurality of sub-sets of MIMO transmitters, and wherein the control logic is configured to, for a first MIMO receiver in the one or more MIMO receivers:
perform range transformation over a plurality of chirps received by the first MIMO receiver to generate slow time radar data;
demodulate the slow time radar data using sub-set digital codes associated with the plurality of sub-sets of MIMO transmitters to generate sub-set partitioned slow time radar data;
perform Doppler transformation on the sub-set partitioned slow time radar data to generate sub-set partitioned Doppler radar data; and
demodulate the sub-set partitioned Doppler radar data using Doppler-division codes for the transmitters within each of the plurality of sub-sets of MIMO transmitters.

13. The radar sensor of claim 12, wherein the sub-set digital codes are pseudo-random digital codes selected from pseudo-random code sequences associated with each of the plurality of sub-sets of MIMO transmitters.

14. The radar sensor of claim 12, wherein the plurality of MIMO transmitters are disposed on a plurality of MIMO radar transceiver devices, and wherein the MIMO transmitters disposed on each MIMO radar transceiver device are in the same sub-set of MIMO transmitters.

15. The radar sensor of claim 12, wherein the control logic is further configured to generate the plurality of sub-sets of MIMO transmitters during runtime of the radar sensor.

16. The radar sensor of claim 12, wherein the control logic is configured to reassign MIMO transmitters to sub-sets during runtime of the radar sensor in response to one or more runtime conditions.

17. The radar sensor of claim 12, wherein the control logic is configured to decode a first radar signal generated by a first MIMO transmitter of the plurality of MIMO transmitters using a first sub-set digital code that identifies a first sub-set of the plurality of sub-sets of MIMO transmitters to which the first MIMO transmitter is assigned and a first Doppler-division code that identifies the first MIMO transmitter within the first sub-set.

18. The radar sensor of claim 12, wherein the control logic is further configured to identify one or more targets in a field of view of the radar sensor using the received radar signals decoded using the mixture of sub-set digital codes and Doppler-division codes.

19. The radar sensor of claim 12, wherein the control logic is further configured to generate a point cloud for a field of view of the radar sensor using the received radar signals decoded using the mixture of sub-set digital codes and Doppler-division codes.

20. The radar sensor of claim 12, wherein the received radar signals include reflected signals generated by reflection of transmitted radar signals transmitted by the plurality of MIMO transmitters off of one or more targets in a field of view of the radar sensor.

* * * * *